June 23, 1959 W. KEILIG 2,891,467
MARKING DEVICE FOR EDGE-WISE CONVEYOR SYSTEMS
Filed Oct. 19, 1953
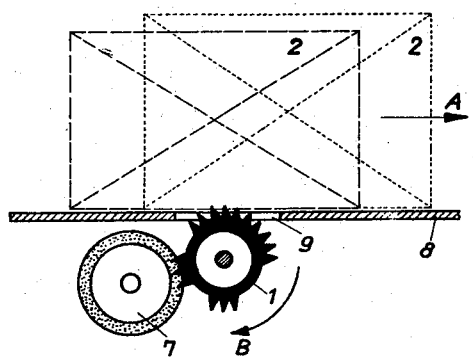
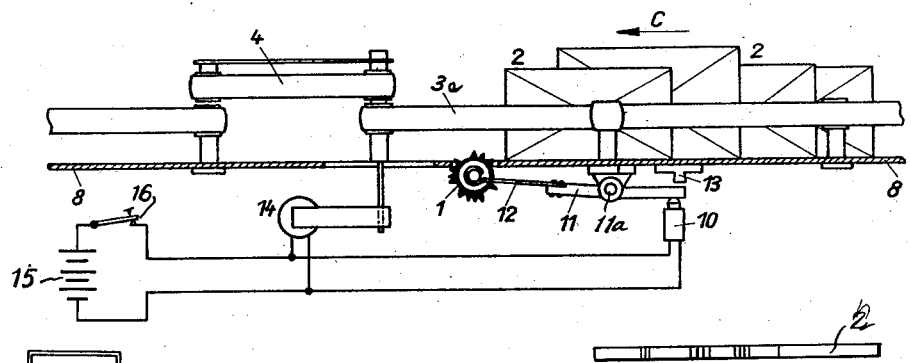
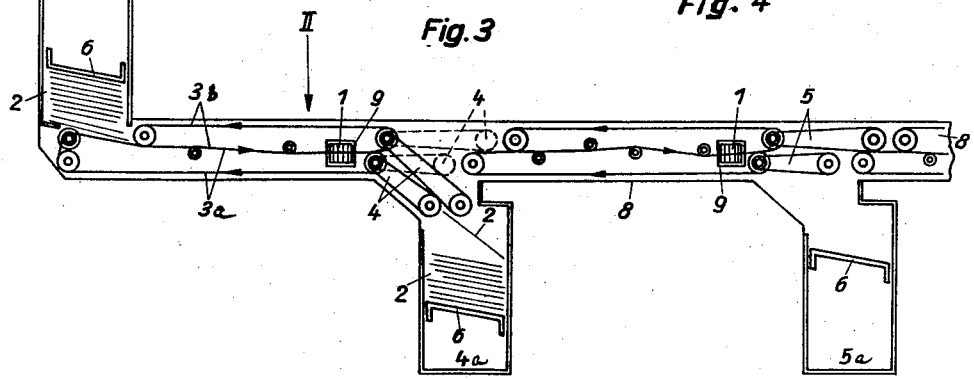
INVENTOR
W. KEILIG
BY Robert Harding Jr.
ATTORNEY United States Patent Office 2,891,467
Patented June 23, 1959

2,891,467

MARKING DEVICE FOR EDGE-WISE CONVEYOR SYSTEMS

Wolfgang Keilig, Berlin-Neukolln, Germany, assignor to Mix & Genest Aktiengesellschaft, Stuttgart-Zuffenhausen, Germany, a corporation of Germany Application October 19, 1953, Serial No. 386,963

Claims priority, application Germany October 18, 1952

3 Claims. (Cl. 101—2)

The present invention relates to a device for check-marking flat-type dispatched articles, such as letters, cards, etc., in conveyor systems, particularly edge-wise conveyor systems.

Such a marking is desired in systems such as distributing machines in order to be able to trace the respective operator by means of the applied check-mark in the event the dispatch articles have been wrongly routed in the course of the sorting process.

The application of check-marks to the dispatch articles is known according to the prior art. With regard to bulk goods the check stamps are mostly applied to one of the two sides of the dispatched article.

However, there are cases in which the application of a check-mark to the flat side of an object is only possible if the type of marking does not impair the value of the object. With regard to picture-postcards, for instance the marks must be exclusively applied to the neutral portions, because an otherwise applied marking, on the side of the picture, or within the space reserved for writing, is undesirable. However, if this marking is to be applied automatically, then it may only be performed in a space which is specially reserved for this purpose. The hitherto known conveyer systems and stamping methods do not comply with the aforesaid requirements and besides, it often happens that the dispatched articles are led past the stamping facilities in a staggered succession, or completely overlapping each other.

The present invention avoids these drawbacks and permits a marking of the respective flat articles without impairing the value thereof. In accordance with this invention it is even possible that the dispatched articles overlap each other partially or completely. This will be achieved by the invention in that the device will apply a marking to one edge of the dispatched goods by means of a stamping appliance. The advantage of a marking made in accordance with my invention renders it unnecessary to position each article with respect to each of its adjacent articles.

According to one feature of the invention, the marking of the dispatched articles is effected during the conveying process by means of stamping devices. These stamping devices are arranged at the launching points leading to the respective operator positions and are provided with characteristic markings corresponding to the different launching points (e.g. colour, type of check mark).

According to another feature of the invention, the stamping devices may mark the supporting edge of the dispatched article. For this reason the dispatched article should, if possible, rest with its entire bottom edge on the plane of the conveying system.

In accordance with another embodiment of the invention, the stamping devices utilize stamp rollers which are driven, or else are idly rolled by the friction caused by contact with the dispatched article. These rollers are only applied to the edges of the dispatched article, if the article is to be launched out of the main conveying direction.

In this arrangement, however, it is also possible to employ stamping tapes for the marking purpose, or else stamps may be oscillated by motors operating at a certain marking frequency. It is of a special advantage to bring the stamping devices into their working position together with the launching devices (switches).

The invention will be more particularly described with reference to an example of embodiment represented in Figs. 1–4 of the accompanying drawing, in which:

Fig. 1 shows a stamp roller or marking device with a letter sliding over it,

Fig. 2 is a diagrammatic elevation of a conveyor system employing this marking device and viewed in the direction of arrow II of Fig. 3.

Fig. 3 is a diagrammatic plan view of this conveyor system but drawn to a scale smaller than that of Fig. 2.

Fig. 4 is a plan view of the lower edge of an envelope together with the coded markings incribed thereon by the stamp roller shown in Fig. 1.

As may be seen from Fig. 1, a stamp roller 1, movable in the direction of arrow B, applies the check mark of a launching point to the bottom edge of a letter 2 moved in the direction of arrow A. The stamp roller will be inked by means of a conventional arrangement, such as an ink roller 7, in the usual way. Depending upon the surface design of the roller, marking lines with equal or unequal spaces will be printed to the edge. Roller 1 projects through an aperture 9 of a mounting and guide plate 8 into the conveying path.

Figs. 2 and 3 show the installation of the roller into an edgewise conveyor system. The dispatched articles coming out of a feed magazine 3 (Fig. 3) are seized between the usual conveyor belts 3a, 3b, and are conveyed between them and between article-deflecting devices 4, 5, to stacking containers 4a, 5a, at which the operators are working. The details of the article-deflecting devices 4 and 5 may be better understood by reference to U.S. Patent No. 2,809,741. A short distance before the article-deflecting devices 4, 5 recesses 9 for the stamp rollers 1 are provided in the said plate 8. 6 designates plates which are displaceable in the magazine 3 and containers 4a, 5a. The dispatch articles 2 from magazine 3 are caused to run over the indents of the stamp roller 1 allocated to the deflecting-device 4. This stamp roller will be brought to project into this portion of the conveying path if deflecting-device 4 is set to the launching position. Preferably the swivelling of the deflecting-device and the placement of the stamp roller into the conveying path are performed at the same time.

The swivelling of the roller into the conveying path is represented in Fig. 2. The article-deflecting device 4 is angularly displaced under control of solenoid 14 and the wheel 1 is pivoted at point 11a under control of magnet 10. Both magnet 10 and solenoid 14 are shown connected in parallel to a battery source 15 and an operating key 16. Here the direction in which the conveyed articles such as letters 2 are moving is designated C. The magnet 10 is arranged to operate a two-armed lever 11, one arm thereof cooperating with magnet 10 and the other arm of which is prolonged by a flat spring 12 that has its free end designed as a support for the stamp roller 1. On account of the spring action the stamp roller is capable of giving way downwards, e.g. in the case of a strong pressure effected by the dispatched article. The spring, however, maintains the stamp roller into frictional engagement with the bottom edge of the dispatched article and the roller will be caused to idly rotate and leave its characteristic marking along said edge. 14 denotes the magnet that controls the deflecting device 4. The stamp roller 1 will return to normal, together with lever 11, until lever 11 abuts against a limit stop 13. The bottom edge of the letters 2 will receive a marking similar to that shown in Fig. 4 and which marking will be composed of groups of spaced parallel marks running transverse to the length of the letter envelope 2. It should be realized that the showing in Fig. 4 represents a magnified thickness of the envelope so that the type of marking which will be obtained may be more readily appreciated. In practice, the markings would appear as elongated dots.

The check marking may be performed in various manners, e.g. as is mentioned already in the foregoing, by means of different dimensions and spaces between the indents of the stamp roller, or else by means of providing special colors, so that a special check marking may be allotted to each particular operator position. It is also possible to cause the stamp to vibrate by means of a vibration frequency, in which case different frequencies would be allotted to the individual operator positions. From the number of vibrations it will be possible to trace the operator who dealt with each dispatched article.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A marking device for edgewise conveyor systems comprising in combination, main belt conveyor means adapted to carry flat articles of random length and height in an edge-wise position, a plurality of stations disposed along said main belt means, each of said stations comprising article-receiving means, article-deflecting means for deflecting articles from said main belt means to said article-receiving means, an article-marking wheel rotatably mounted on an axle and having distinctive code markings around the periphery thereof, said markings indicative of that station, said wheel adjacent said main belt means and having its axle normal to the direction of movement of said main belt means, said wheel normally in non-recording position with respect to articles carried by said main belt means, a first electro-magnet for actuating said article-deflecting means, a second electro-magnet for moving said wheel into recording contact with an edge of the lower article as it arrives at the vicinity of said station, and means for simultaneously actuating both said electro-magnets whereby as a selected one of said articles is deflected from said main belt means to said article-receiving means, the edge of said selected article engages the periphery of said wheel and frictionally rotates same and is marked by said wheel with said distinctive code indicative of said station.

2. A device as claimed in claim 1, further comprising a resilient support for carrying said axle and wheel, said support adapted to yieldably tension said wheel against the lower edge of an article when said electro-magnets are actuated.

3. A device as claimed in claim 1, wherein said main belt conveyor means comprises a fixed guide plate over which said articles are adapted to be glidingly carried, said plate having an aperture therethrough at each of said stations, said wheels adapted to be urged into their associated apertures and into the path of the lower edge of said articles upon energization of their associated electro-magnet.

References Cited in the file of this patent
UNITED STATES PATENTS

| | | |
|---|---|---|
| 868,793 | Metzner | Oct. 22, 1907 |
| 889,328 | Owens et al. | June 2, 1908 |
| 1,156,337 | Wood | Oct. 12, 1915 |
| 1,535,539 | Mitton | Apr. 28, 1925 |
| 1,537,603 | Hale | May 12, 1925 |
| 1,910,461 | Bower | May 23, 1933 |
| 2,124,376 | Rona | July 19, 1938 |
| 2,315,003 | Martin et al. | Mar. 30, 1943 |
| 2,462,590 | Albertoli | Feb. 22, 1949 |
| 2,497,874 | Evans et al. | Feb. 21, 1950 |
| 2,641,998 | Donald | June 16, 1953 |
| 2,719,629 | Robinson | Oct. 4, 1955 |